United States Patent [19]
Normandeau et al.

[11] Patent Number: 5,516,360
[45] Date of Patent: May 14, 1996

[54] ABRASION RESISTANT GAS SEPARATOR

[75] Inventors: Lawrence J. Normandeau, Edmonton; Robert D. DeLong, LeDuc, both of Canada

[73] Assignee: Baker Huges Incorporated, Houston, Tex.

[21] Appl. No.: 224,898

[22] Filed: Apr. 8, 1994

[51] Int. Cl.⁶ .................................................. B01D 19/00
[52] U.S. Cl. .................. 96/207; 55/403; 55/406; 96/214; 96/217; 166/105.5
[58] Field of Search .................. 55/403, 406; 96/204, 96/206, 207, 208, 214, 215, 217; 166/105.5

[56] References Cited

U.S. PATENT DOCUMENTS

| | | | |
|---|---|---|---|
| 1,279,758 | 9/1918 | Putnam | 96/214 |
| 3,175,501 | 3/1965 | Carle . | |
| 3,624,822 | 11/1971 | Carle et al. | 96/217 |
| 3,887,342 | 6/1975 | Bunnelle . | |
| 3,972,352 | 8/1976 | Bunnelle . | |
| 4,088,459 | 5/1978 | Tuzson . | |
| 4,394,140 | 7/1983 | Liljestrand | 55/406 |
| 4,481,020 | 11/1984 | Lee et al. | 96/214 |
| 4,981,175 | 1/1991 | Powers | 55/406 |
| 5,207,810 | 5/1993 | Sheth . | |

Primary Examiner—C. Scott Bushey
Attorney, Agent, or Firm—James E. Bradley

[57] ABSTRACT

A gas separator for a submersible centrifugal pump or well has hardened cases on the components exposed to well fluid within the interior of the gas separator. The gas separator has a cylindrical sidewall with a bore. A shaft driven by a motor of the pump extends through the bore. An inducer is located in the bore for applying pressure to the fluid. In one type, a spinning guide vane imparts swirling motion for the well fluid to separate as it flows through a straight-through bore section. In another type, a tubular barrel locates in the sidewall, defining an intake chamber. The intake port in the sidewall is located above the intake port in the barrel, causing a reverse direction flow to separate gas from the liquid.

5 Claims, 2 Drawing Sheets

ABRASION RESISTANT GAS SEPARATOR

BACKGROUND OF THE INVENTION

1. Field of the Invention

This invention relates in general to electrically driven centrifugal submersible well pumps, and in particular to a gas separator for separating gas from the well fluid prior to reaching the pump.

2. Description of the Prior Art

Submersible well pumps of the type concerned herein are centrifugal and driven by a downhole electrical motor. A pump will have a large number of stages, each stage having an impeller rotatably driven within a diffuser. These pumps are used to pump large volumes of fluid, such as oil and water from wells.

Most oil wells will also typically produce some gas. If the gas is of sufficient volume, it can reduce the performance of the pump. In these circumstances, gas separators are mounted in the assembly below the pump and above the motor and the seal section.

One type of gas separator utilizes an inducer within a housing above intake ports to pump the well fluid. The inducer is a helical flight screw pump driven by the shaft of the motor. A rotatably driven guide vane mounts above the inducer to impart a swirling motion to the fluid. A rotatably driven rotor is located above the guide vane. The rotor is a cylinder having at least one radially extending blade or vane. The vane will impart a centrifugal force to the well fluid flowing through the housing. This centrifugal force separates the liquid components from the gas components because of difference in densities, with the liquid components flowing near the outer wall of the rotor, and the gas flowing in a central area surrounding the shaft.

A discharge member mounts above the rotor. The discharge member provides a passage from the central portion of the rotor to the exterior of the gas separator to discharge gas. The discharge member also provides a liquid passageway for the remaining portion of the well fluid to flow upward toward the intake of the pump.

The rotating rotor gas separators work sufficiently well. However, in some wells, considerable entrained sand is present in the well fluid flowing up from the well. The sand will be damaging to the rotating components in the gas separator, causing abrasion and excessive wear.

Another type of prior art gas separator, such as shown in U.S. Pat. No. 3,175,501, Mar. 30, 1965, J. T. Carle, does not use a rotating rotor. Rather, the separation occurs due to reverse flow as the upward flowing well fluid enters ports in the sidewall of the gas separator and flows downward to a single stage pump impeller. The change in direction results in a separation of a portion of the gas. The reverse flow separator is effective in wells that do not have high gas-oil ratios. The reverse flow separator, however, uses a rotating impeller at the base for drawing in the well fluid. The impeller is subject to abrasion due to sand, causing early failure.

SUMMARY OF THE INVENTION

In this invention, two embodiments are shown, both configured to reduce the damaging effects of sand abrasion. In one embodiment, a reverse flow separation is employed rather than a rotating rotor. That embodiment uses a tubular barrel which extends axially within the sidewall or housing of the gas separator. The barrel has a smaller outer diameter than the housing sidewall, resulting in an annular clearance or intake chamber between the barrel and the sidewall. At least one upper port is located in an upper portion of the sidewall. A lower port is located in a lower portion of the barrel.

An inducer, which is a helical flight pump, is located inside the barrel. The inducer draws fluid through the upper port, down through the lower port, and pumps it straight upward through the barrel. The reverse flow causes a significant separation of the gas. The inducer does not impart a centrifugal high velocity flow to well fluid.

In the second embodiment, the intake is at the lower end of the separator. The intake can either be from a lower gas separator, or it can be from intake ports extending through the lower portion of the sidewall of the housing. In this type, again, an inducer serves as the primary pumping means for pumping the fluid upward to the intake of the pump. A guide vane is located directly above the inducer for imparting a swirling motion to the fluid being pumped by the inducer. A straight-through bore section locates above the guide vane for allowing the fluid to separate due to different densities. The rotor of the prior art gas separator is eliminated.

In both embodiments, protective sleeves are placed on exposed portions of the drive shafts, the protective sleeves having a hardened case to resist abrasion. Also, in both embodiments, components of the separator exposed to the fluid have hardened cases to resist abrasion. For example, hardened cases are on the inducer and on the interior wall of the sidewall as well as on the bearings.

DETAILED DESCRIPTION OF THE INVENTION

Figure 1:
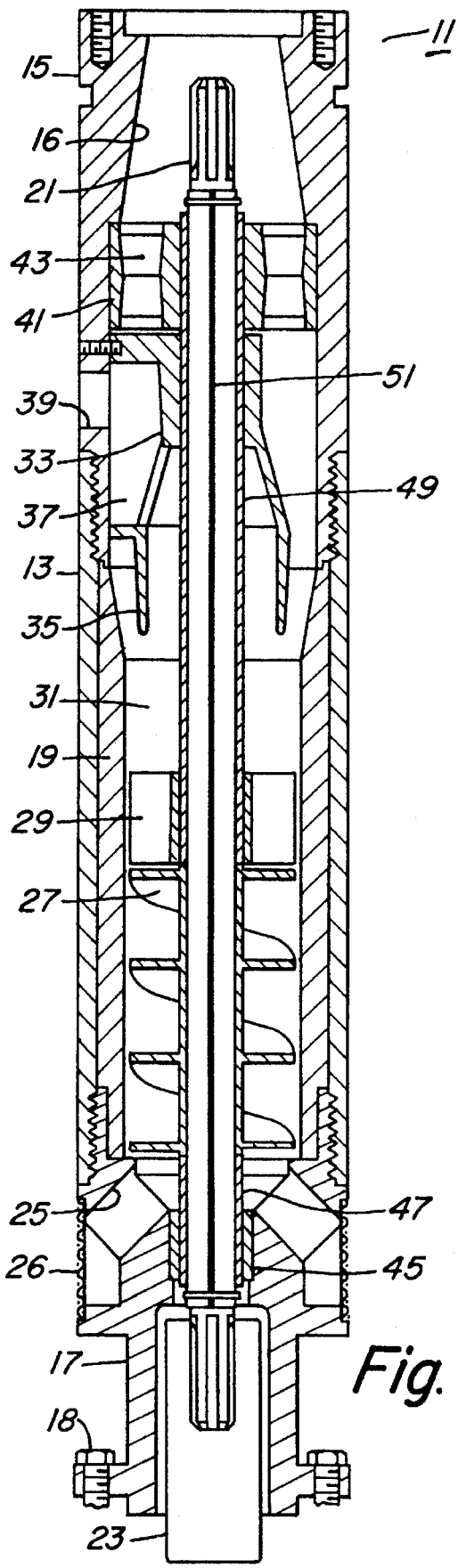
FIG. 1 is a sectional view of a first embodiment of a gas separator constructed in accordance with this invention.

Referring to FIG. 1, gas separator 11 is a tubular member having a sidewall or housing 13. A head 15 secures to the upper end of housing 13 by threads. Head 15 is adapted to be coupled to an intake or lower end of a conventional submersible, centrifugal pump. Head 15 has an axial discharge passage 16. A base 17 secures to the lower end of housing 13 by threads. Base 17 secures by bolts 18 to the upper end of a seal section (not shown) of a motor.

The sidewall of gas separator 11 includes also a tube 19 that extends closely within housing 13. Tube 19 extends from base 17 to head 15. A shaft 21 extends axially through housing 13. A coupling 23 is schematically shown for coupling shaft 21 to a driven shaft from a seal section and motor (not shown). The upper end of shaft 21 connects to the pump.

A plurality of inlet ports 25 are located in base 17. Inlet ports 25 incline upward for drawing fluid into the lower end of tube 19. Optional screens 26 may be employed over inlet ports 25, if desired. An inducer 27 is mounted to shaft 21 for rotation therewith. Inducer 27 is a helical, screw type pump. It comprises a helical flight, which when rotated, will pump well fluid upward. A guide vane 29 mounts directly above inducer 27 for rotation with shaft 21. Guide vane 29 comprises one or more flat or curved plates, each being inclined relative to the axis of shaft 21, for imparting a swirling motion to the fluid being pumped by inducer 27.

A straight-through bore section 31 is located above guide vane 29. In the prior art, a rotating rotor would be located in the straight-through bore section 31. Straight-through bore section 31 comprises a section of bore which is free of any rotating components that might otherwise impart any centrifugal force or motion to the well fluid. Straight-through bore section 31 has a length selected which allows the swirling well fluid to separate into heavier liquid components near the outer wall of tube 19 and lighter gaseous components near the shaft 21. The axial length of straight-through bore section 31 is greater than the axial length of the guide vane 29. In the embodiment shown, straight-through bore section 31 extends for a length that is about one-half the length of inducer 27. The length in the preferred embodiment is the same length as the bore section that received the rotor in the prior art separator.

A discharge member 33 is mounted stationarily in housing 13 and head 15 at the upper end of straight-through bore section 31. Discharge member 33 has a lower lip 35 that is circular and locates approximately midway between shaft 21 and tube 19. The interior of lip 35 defines an inner collection area around shaft 21 for collecting the separated gas. Three gas passages 37 (only one shown) join the inner collection area within lip 35. Each gas passage 37 registers with a gas discharge port 39 formed in head 15, which may be considered a portion of the sidewall of gas separator 11. The gas will flow out ports 39 and discharge to the exterior of gas separator 11. The liquid components in an outer area near the wall of tube 19 flow around the exterior of lip 35 upward through a bearing 41. Bearing 41 has axial passages 43 for fluid to flow upward through discharge passage 16 to the intake of the pump.

Shaft 21 is supported by a bushing 45 on its lower end. Shaft 21 is protected from sand abrasion by a sleeve, which comprises a lower sleeve 47 located in bushing 45 and an upper sleeve 49. Upper sleeve 49 extends from guide vane 29 upward through bearing 41. Sleeves 47, 49 rotate with shaft 21. A key 51 causes sleeves 47, 49 as well as guide vane 29 and inducer 27 to rotate with shaft 21.

The components of gas separator 11 exposed to the flowing fluid have hardened cases for resisting abrasion from sand. The hardened cases are formed conventionally and may have hardness selected to best resist abrasion, such as a hardness greater than 50 Rockwell "C". The hardened cases are located on bushing 45, sleeves 47, 49, inducer 27, guide vane 29, the inner wall of tube 19, and a bushing within bearing 43.

In the operation of embodiment FIG. 1, well fluid will flow through entry ports 35 as a result of the rotation of inducer 27. Inducer 27 applies pressure to the well fluid, which flows upward through guide vane 29. The guide vane 29 imparts a swirling motion to the well fluid, causing separation between the gas and liquid in the straight-through bore section 31. The heavier liquid flows on the outer side of lip 35, up through bearing passages 43, discharge passage 16 and into the intake of the pump. The gas flows within the interior of lip 35 and through the gas passages 37 and outlet ports 39.

Although inducer 27 and guide vane 29 impart a swirling motion to the well fluid, they do not impose a high velocity centrifugal force to the well fluid. The velocities of the flowing fluid are much lower than velocities created by a rotating rotor or an impeller pump stage of the prior art types. The lower velocities reduce abrasion. The gas separator 11 can be utilized singly, as shown. Alternately, it may be incorporated with other gas separators.

Figure 2:
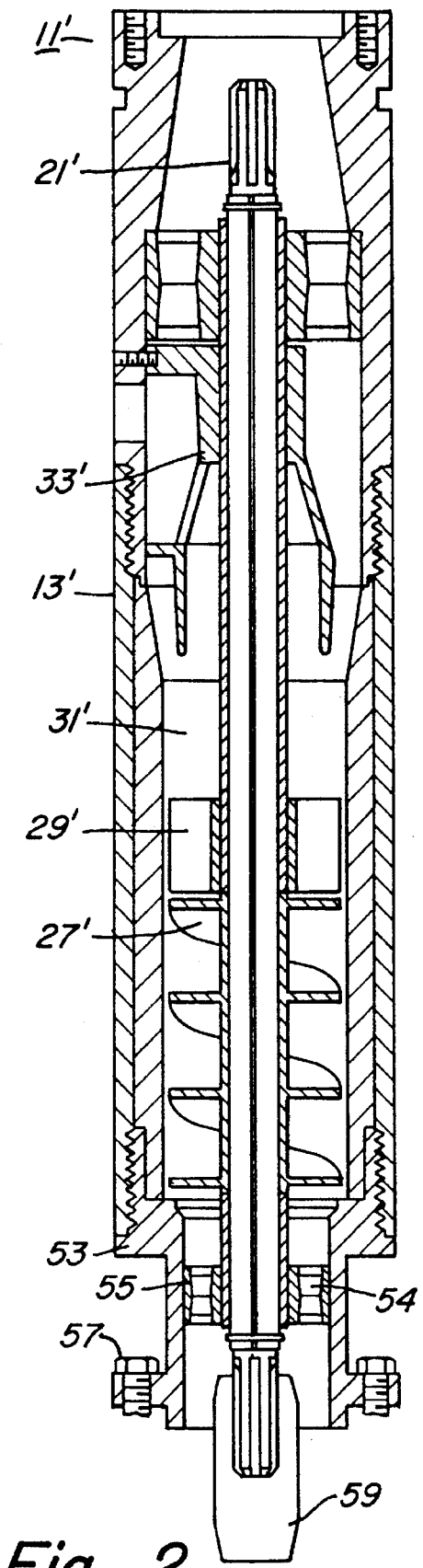
FIG. 2 shows a sectional view of the same gas separator as in FIG. 1, but with a base on the lower end for connection in tandem to another gas separator.

In FIG. 2, common components are numbered the same as in FIG. 1, but shown with a prime symbol. Gas separator 11' has essentially the same structure as separator 11, however, it is configured to be coupled in tandem to a lower gas separator which may be the same or a different type. Gas separator 11' has a rotating shaft 21'. Gas separation occurs by inducer 27' and guide vanes 29' imparting a swirling motion to the well fluid as it flows through bore section 31'. The components are separated at the discharge member 33' as previously explained.

Figure 3:
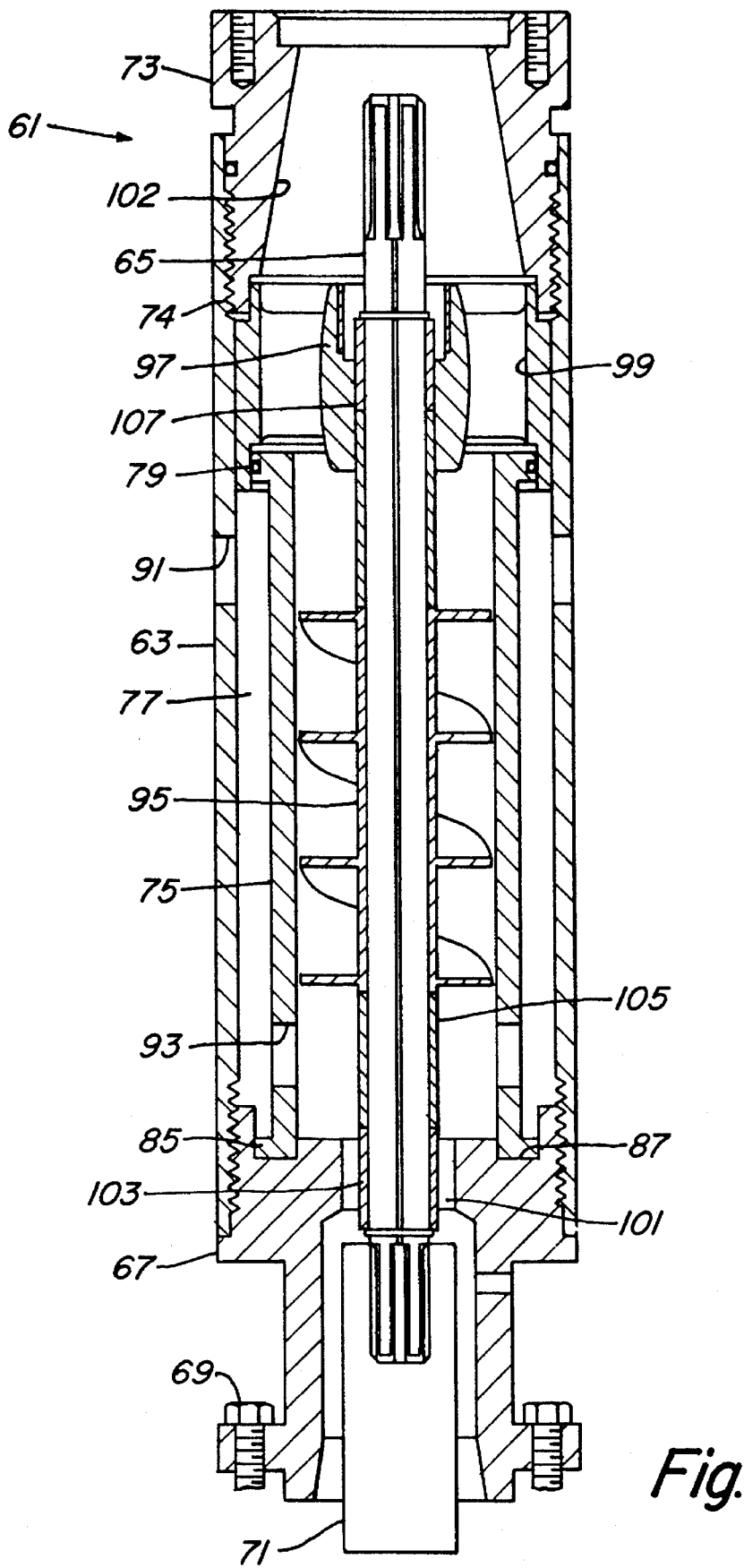
FIG. 3 is a sectional view of an alternate embodiment of a gas separator.

Rather than inlet ports 25 in base 17, as in the embodiment of FIG. 2, base 53 comprises a lower adapter for coupling to another gas separator, which could be the upper end of the gas separator of FIG. 1, or the gas separator of FIG. 3. Base 53 has a lower bearing 55 with passages 54 for the passage of well fluid flowing upward through base 53. Bearing 55 supports shaft 21'. Bolts 57 are used to bolt the base 53 to another gas separator. Coupling 59 is used to couple the shaft 21' to another gas separator. Other than the lower adapter components, the operation and structure is the same as in FIG. 1.

FIG. 3 shows a gas separator 61 which could be employed either by itself or as the lower portion of a tandem for the gas separator 11' of FIG. 2. Gas separator 61 has a housing which includes sidewall 63. A shaft 65 extends axially through sidewall 63. A base 67 connects to the lower end of sidewall 63 by threads. Bolts 69 are employed with base 67 to connect gas separator 61 to the upper end of a seal section of a motor (not shown). Coupling 71 is used to couple shaft 65 to the shaft being driven by the motor.

A head 73 secures to the upper end of sidewall 63 by threads 74. A barrel 75 is located within sidewall 63 and is about three-fourths the length of sidewall 63. Barrel 75 has a smaller outer diameter than the inner diameter of sidewall 63, resulting in an annular intake chamber or clearance 77. Barrel 75 has a seal 79 on its upper end and a flange 85 on its lower end that protrudes radially outward and locates within a recess 87 formed on the upper surface of base 67. Bolts (not shown) extend through flange 85 and secure the barrel 75 to base 67.

A plurality of upper ports 91 extend through sidewall 63 near the upper end of barrel 75. Ports 91 extend radially through sidewall 63, communicating the exterior well fluid with the intake chamber 77. A plurality of lower ports 93 are located near the lower end of barrel 75. Well fluid flows in upper ports 91, down intake chamber 77 and into barrel 75 through lower ports 93.

An inducer 95 is mounted in barrel 75 above base 67. Inducer 95 is a helical flight screw pump which rotates in unison with shaft 65. The flight of inducer 95 begins about one-fourth of the length of barrel 75 from base 67 and terminates approximately one-fourth the length from the upper end of barrel 75.

An upper bearing assembly 97 is located above barrel 75 for providing radial support to shaft 65. Upper bearing assembly 97 has axially extending passages 99 for the well fluid flow. Upper bearing assembly 97 press fits into sidewall 63 and is retained by head 73. Seal 79 of barrel 75 seals within a counterbore on the lower side of upper bearing assembly 97. Head 73 has an axial bore or discharge passage 102 to discharge well fluid upward. Shaft 65 is supported at the lower end by a bushing 101 and a sleeve 103, bushing 101 being stationary, and sleeve 103 rotating with shaft 65.

A protective sleeve 105 surrounds and rotates with shaft 65. Sleeve 105 extends from the lower end of inducer 95 to the upper end of sleeve 103, which is approximately at the upper surface of base 67. An upper sleeve 107 extends from the upper end of inducer 95 through the hub of bearing assembly 97. The components of gas separator 61 that are exposed to well fluid have hardened cases to resist abrasion from entrained sand in the well fluid. These components include bushing 101, sleeves 103, 105 and 107, inducer 95, and barrel 75.

In the operation of the gas separator 61, well fluid will flow up the exterior of sidewall of 63 as a result of suction created by the rotation of inducer 95. As the well fluid enters ports 91 and flows down intake chamber 77, it reverses direction. Reversal in direction causes a significant portion of the gas to separate from the liquid. The separated gas will migrate upward along the exterior of sidewall 63. The heavier liquid components will flow downward in intake chamber 77. The well fluid is pumped upward by inducer 95 through bearing passages 99 and discharge passage 102. The fluid either flows directly into a pump, or alternately, it may flow into another gas separator for further separation, such as gas separator 11' of FIG. 2. The inducer 95 does not impart a high velocity centrifugal flow to the flowing fluid.

The invention has significant advantages. In both embodiments, high speed flow of the well fluid is reduced over the prior art so as to avoid excessive abrasion due to sand. In the first embodiment, eliminating the rotor and utilizing a straight-through bore section allows significant gas separation without the high speed velocities imparted due to the spinning rotor. In the second embodiment, the use of an inducer rather than an impeller avoids high velocity centrifugal flow being imparted to the well fluid. The protective sleeves and hardened cases of the various components further aid in resisting abrasion. A hardened case can be readily applied to an inducer, unlike the internal surfaces within an impeller and diffuser pump stage.

While the invention has been shown in only three of its forms, it should be apparent to those skilled in the art that it is not so limited but susceptible to various changes without departing from the scope of the invention.

We claim:

1. In a gas separator for a submersible centrifugal pump for a well, the gas separator having a cylindrical sidewall with a bore extending therethrough, a shaft driven by a motor of the pump and extending axially through the bore, an inducer having a helical flight mounted to the shaft for rotation therewith at a lower end of the sidewall, a guide vane located directly above the inducer for rotation with the inducer and the shaft, a discharge member mounted stationarily at the upper end of the separator, having a gas passage leading from an inner area around the shaft to the exterior of the sidewall, and defining a liquid passage leading from an outer area near the sidewall upward to the intake of the pump, the improvement comprising in combination:

a protective sleeve mounted to the shaft and extending from the guide vane upwards through the discharge member; and a straight-through bore section within the sidewall above the guide vane and below the discharge member, the straight-through bore section being free of any rotating structure located between the sleeve and the sidewall, the straight-through bore section having an axial length greater than an axial length of the guide vane allowing upward flowing fluid swirling upward from the guide vane to separate into gas within the inner area and liquid within the outer area.

2. The gas separator according to claim 1 further comprising:

a hardened case on the protective sleeve, inducer and on an inner wall of the sidewall for resisting wear due to entrained sand within the well fluid.

3. A gas separator for a submersible centrifugal pump for a well, comprising in combination:

a housing having a cylindrical sidewall, a longitudinal axis and a gas outlet adjacent an upper end of the housing;

a shaft driven by a motor of the pump and extending axially through the housing;

an intake member secured to a lower end of the housing for receiving well fluid having liquid and gas components;

a discharge member secured to the housing adjacent an upper end of the housing, the discharge member having a flow dividing lower end, a gas passage leading from an inner area around the shaft at the flow dividing lower end to the gas outlet, and a liquid passage leading from an outer area near the sidewall at the flow dividing lower end upward to the intake of the pump;

an inducer having a helical flight mounted to the shaft for rotation therewith, having a lower end adjacent to the intake member for pressurizing the well fluid flowing upward from the intake member;

a guide vane located directly above the inducer for rotation with the inducer and the shaft to impart a swirling motion to the fluid flowing upward from the inducer to cause centrifugal separation of the gas and liquid components;

a protective sleeve mounted to the shaft and extending from the guide vane upwards through the discharge member;

a straight-through bore section within the sidewall of the housing, extending from an upper end of the guide vane to the flow dividing lower end of the discharge member, the straight-through bore section being free of any rotating structure between the sleeve and the sidewall of the housing to avoid imparting any additional swirling motion to the fluid, the straight-through bore section having an axial length greater than an axial length of the guide vane for allowing upward flowing fluid swirling upward from the guide vane to separate into gas within the inner area and liquid within the outer area; and a hardened case on the protective sleeve, the inducer and an inner surface of the sidewall for resisting wear due to entrained sand within the well fluid.

4. A gas separator for a submersible centrifugal pump for a well, comprising in combination:

a housing having an inner cylindrical wall, a longitudinal axis and a gas outlet adjacent an upper end of the housing;

a shaft driven by a motor of the pump and extending axially through the housing;

an intake member secured to a lower end of the housing for receiving well fluid having liquid and gas components;

a discharge member secured to the housing adjacent an upper end of the housing, the discharge member having a flow dividing lower end, a gas passage leading from an inner area around the shaft at the flow dividing lower end to the gas outlet, and a liquid passage leading from an outer area at the flow dividing lower end upward to the intake of the pump;

an inducer having a helical flight mounted to the shaft for rotation therewith, having a lower end adjacent to the intake member for pressurizing the well fluid flowing upward from the intake member;

a guide vane located directly above the inducer for rotation with the inducer and the shaft to impart a swirling motion to the fluid flowing upward from the inducer to cause centrifugal separation of the gas and liquid components;

a protective liner located within the housing surrounding the inducer and guide vane, the liner having a lower end secured to the intake member and an upper end extending above the flow dividing lower end of the discharge member, the liner having an outer wall closely received by the inner cylindrical wall of the housing;

a protective sleeve mounted to the shaft and extending from the guide vane upwards through the discharge member;

a straight-through bore section within the liner extending from an upper end of the guide vane to the flow dividing lower end of the discharge member, the straight-through bore section being free of any rotating structure located between the sleeve and the liner, the straight-through bore section having an axial length greater than an axial length of the guide vane for allowing upward flowing fluid swirling upward from the guide vane to separate into gas within the inner area and liquid within the outer area; and a hardened case on the protective sleeve, the inducer and an inner wall of the liner for resisting wear due to entrained sand within the well fluid.

5. The gas separator according to claim 4 wherein the axial length of the straight-through bore section is about one-half an axial length of the inducer.

* * * * *